(12) United States Patent
Lear et al.

(10) Patent No.: US 10,791,462 B2
(45) Date of Patent: Sep. 29, 2020

(54) FLEXIBLE DEVICE ONBOARDING VIA BOOTSTRAP KEYS

(71) Applicant: Cisco Technology, Inc., San Jose, CA (US)

(72) Inventors: Eliot Lear, Wetzikon (CH); Owen Friel, Galway (IE); Max Pritikin, Boulder, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/281,864

(22) Filed: Feb. 21, 2019

(65) Prior Publication Data

US 2020/0120502 A1 Apr. 16, 2020

Related U.S. Application Data

(60) Provisional application No. 62/745,885, filed on Oct. 15, 2018.

(51) Int. Cl.
*H04W 12/06* (2009.01)
*H04W 12/08* (2009.01)
(Continued)

(52) U.S. Cl.
CPC .......... *H04W 12/06* (2013.01); *H04W 12/04* (2013.01); *H04W 12/0804* (2019.01);
(Continued)

(58) Field of Classification Search
CPC . H04L 63/0823; H04L 9/3263; H04L 9/3268; H04L 9/3247; H04L 2209/80; H04L 63/0853; H04L 9/3255; H04L 63/0861; H04L 63/18; H04L 2209/24; H04L 2209/72; H04L 63/12; H04L 63/0428; H04L 63/08; H04L 63/083; H04L 63/0492; H04L 63/061; H04L 63/20; H04L 9/006; H04L 9/321; H04L 9/3231;
(Continued)

(56) References Cited

U.S. PATENT DOCUMENTS

7,418,596 B1 * 8/2008 Carroll .................. H04L 63/068
713/169
10,382,413 B1 * 8/2019 Friel .................... H04L 63/0428
(Continued)

*Primary Examiner* — Nimesh Patel
(74) *Attorney, Agent, or Firm* — Johnson, Marcou, Isaacs & Nix, LLC (57) ABSTRACT

This technology uses a bootstrap key ("BSK") to securely onboard a computing device to a network. A unique BSK associated with an onboarding computing device is used to verify for various deployment models (1) that the computing device has proof the computing device is connecting to the correct wired or wireless network and (2) that the network has proof the computing device is trusted. The BSK may be an associated BSK or an embedded BSK. A computing device receives a signed voucher from the manufacturer authorized signing authority ("MASA") before the computing device may onboard to a network. The MASA will issue a voucher to a Bootstrapping Remote Secure Key Infrastructure ("BRSKI") registrar if the registrar proves knowledge of the computing device's BSK to the MASA or the registrar has an established trust relationship with the MASA.

19 Claims, 7 Drawing Sheets

(51) Int. Cl.
*H04W 60/00* (2009.01)
*H04W 12/04* (2009.01)
*H04W 48/18* (2009.01)
*H04W 76/11* (2018.01)

(52) U.S. Cl.
CPC ........... *H04W 48/18* (2013.01); *H04W 60/00* (2013.01); *H04W 76/11* (2018.02)

(58) Field of Classification Search
CPC ............. H04L 29/06775; H04L 9/3234; H04L 9/3226; H04L 2463/082; H04L 63/101; H04L 2463/062; H04L 2463/101; H04L 41/0806; H04L 63/06; H04L 63/062; H04L 63/0815; H04L 63/0876; H04L 63/107; H04L 63/108; H04L 67/104; H04L 9/0844; H04L 9/0869; H04L 9/3213; H04L 9/3218; H04L 9/3271; H04L 9/3273; H04L 63/0892; H04L 63/123; H04L 2463/081; H04L 63/068; H04L 63/0807; H04L 63/0869; H04L 63/105; H04L 63/205; H04L 9/0891; H04L 2209/76; H04L 63/10; H04L 29/06755; H04L 63/0884; H04L 9/083; H04L 9/16; H04L 9/302; H04L 2463/061; H04L 9/08; H04L 9/0838; H04L 9/0841; H04L 9/3265; H04L 65/605; H04L 67/02; H04L 63/0442; H04L 65/1073; H04L 67/04; H04L 63/162; H04L 12/66; H04L 2012/5607; H04L 2012/5656; H04L 41/5041; H04L 43/0811; H04L 9/3228; H04L 63/0838; H04L 9/0863; H04L 9/14; H04L 9/30; H04L 67/306; H04L 41/0816; H04L 63/0435; H04L 65/40; H04L 9/0825; H04L 65/103; H04L 9/3236; H04W 12/06; H04W 12/02; H04W 12/08; H04W 12/04; H04W 4/14; H04W 12/0608; H04W 12/1206; H04W 4/023; H04W 12/001; H04W 4/80; H04W 12/0806; H04W 8/205; H04W 8/22; H04W 8/24; H04W 8/265; H04W 12/0023; H04W 12/00409; H04W 88/16; H04W 8/245; H04W 80/04; H04W 12/04031; H04W 4/50; H04W 80/00; H04W 84/042; H04W 84/12; H04W 88/182; H04W 74/00; H04W 92/18; H04W 12/00514; H04W 12/00518; H04W 92/02; H04W 76/10; H04W 88/06; H04W 16/16; H04W 8/04; H04W 12/00516; H04W 48/18; H04W 4/24; H04W 12/002; H04W 12/003; H04W 88/02; H04W 48/16; H04W 8/18; H04W 4/021; G06F 21/33; G06F 21/35; G06F 21/43; G06F 21/45; G06F 21/10; G06F 21/32; G06F 21/335; G06F 2221/2117; G06F 21/31; G06F 21/34; G06F 21/6227; G06F 21/121; G06F 21/575; G06F 21/57; G06F 21/51; G06F 21/602; G06F 8/65; G06F 21/64; G06F 9/4401; G06F 21/572; G06F 2221/034; G06F 221/2115; G06F 21/44; G06F 21/445; G06F 21/46; G06F 2221/2119; G06F 2221/2129; G06F 2221/2103; G06F 21/6218; G06F 21/554; G06F 21/606; H04M 1/7253; H04M 1/675; H04M 1/72569; H04M 3/382; H04M 3/42272; H04M 1/727; H04M 2250/02; H04M 2215/2026; H04M 2215/22; H04M 2215/32; H04M 1/66; H04M 15/90; H04M 2201/54; H04M 3/42136; H04M 3/4228; H04M 1/04; H04M 1/2535; H04M 3/42255; H04M 1/72552; H04M 7/006; G06Q 20/40; G06Q 20/425; G06Q 20/322; G06Q 20/3276; G06Q 20/38215; G06Q 20/3821; G06Q 20/3829; G06Q 20/32; G06Q 20/327; G06Q 20/3278; G06Q 20/40145; G06Q 20/3674; G06Q 20/385; G06Q 20/3226; G06Q 20/0655; G06Q 20/3229; G06Q 30/0613; G06Q 20/4014; G06Q 20/4012; G06Q 20/325; Y02D 70/126; Y02D 70/14; H04N 21/2541; H04N 21/25816; H04N 21/25841; H04N 21/25875; H04N 21/26606; H04N 21/43637; H04N 21/4367; H04N 21/6125; H04N 21/6175; H04N 21/632; H04N 21/63345; H04N 21/63775; H04Q 3/0029; H04Q 3/0037; H04Q 3/0025; H04Q 3/0045
See application file for complete search history.

(56) References Cited

U.S. PATENT DOCUMENTS

| | | | | |
|---|---|---|---|---|
| 2004/0203599 | A1* | 10/2004 | Miller | H04L 63/126 455/411 |
| 2005/0210252 | A1* | 9/2005 | Freeman | G06F 21/31 713/171 |
| 2007/0091843 | A1* | 4/2007 | Patel | H04L 63/0853 370/331 |
| 2008/0178277 | A1* | 7/2008 | Oba | H04L 63/0807 726/10 |
| 2013/0007846 | A1* | 1/2013 | Murakami | H04W 12/04031 726/4 |
| 2014/0033292 | A1* | 1/2014 | Moore | G06F 21/35 726/9 |
| 2014/0189841 | A1* | 7/2014 | Metke | H04L 63/0815 726/9 |
| 2016/0294842 | A1* | 10/2016 | Ramalingam | H04L 63/08 |
| 2018/0352417 | A1* | 12/2018 | Butler | H04M 3/42144 |

* cited by examiner

FLEXIBLE DEVICE ONBOARDING VIA BOOTSTRAP KEYS

CROSS REFERENCE TO RELATED APPLICATIONS

This application claims the benefit of U.S. Provisional Patent Application No. 62/745,885 filed Oct. 15, 2018 and entitled "Flexible Device Onboarding Via Bootstrap Keys," the entire contents of which are hereby fully incorporated herein by reference.

TECHNICAL FIELD

This disclosure relates to the use of bootstrap keys, along with enhancements to bootstrapping remote secure key infrastructure ("BRSKI") vouchers, to enable secure bootstrap of devices across both consumer and enterprise networks.

BACKGROUND

In many conventional technologies, when a device (for example, an internet of things device, a collaboration endpoint, and other networkable devices) is powered up for the first time and connected to a wired or Wi-Fi enterprise network enforcing IEEE 802.1X authentication, the device needs to verify that it is connecting to the correct network and not to a rogue network. The network also needs proof that a trusted device is connecting. It is generally not practical or economical to achieve this trust relationship by pre-provisioning the device with the network's public key (for example, the IEEE 802.1X TLS public key of an Extensible Authentication Protocol ("EAP") server). Additionally, conventional technologies do not allow the network to prove to the device that the network has knowledge of the device's authentication key.

DETAILED DESCRIPTION

Overview

In many cases, when a computing device (for example, an internet of things ("IoT") device, a collaboration endpoint, and other networkable devices) is powered up for the first time and connected to a wired or wireless network, the computing device needs to verify that the computing device is connecting to the correct network, and the network needs proof that a trusted computing device is attempting a connection.

The technology described herein provides techniques for leveraging a unique authentication key or bootstrap key ("BSK") associated with an onboarding computing device to ensure, for various deployment models, that the computing device has proof the computing device is connecting to the correct wired or wireless network and the network has proof the computing device is trusted. Providing identifying information about the computing device such as the BSK on the network is a scalable and economical mechanism in that the network may securely prove knowledge of this identifying information to the computing device without leaking the identifying information to rogue devices or networks.

For various deployment models, the techniques provided herein prevent a computing device from connecting to a rogue network. The techniques take place within an Extensible Authentication Protocol ("EAP") authentication exchange via a Transport Layer Security ("TLS"), and avoid the complexities of any IEEE 802.1, 802.11 or Wi-Fi Alliance standards enhancements. The techniques allow secure connection to a network without the definition of any new, or extensions to any existing, IEEE 802.11, IEEE 802.1 or Wi-Fi Alliance standards. The techniques may be integrated with bootstrapping remote secure key infrastructure ("BRSKI").

The technology described herein leverages bootstrapping remote secure key infrastructure ("BRSKI") wherein a computing device receives a signed voucher from the manufacturer authorized signing authority ("MASA") to allow the computing device to onboard to a network. The MASA may be comprised of one or more computing devices. The MASA will issue a signed voucher to a BRSKI registrar if the registrar proves knowledge of the computing device's BSK to the MASA or the registrar has an established trust relationship with the MASA and is authorized to request vouchers without proving knowledge of the BSK. The registrar may be an authentication management server represented by one or more computing devices.

The registrar receives an input of an authentication key associated with a computing device. The computing device discovers and connects to the registrar and starts an 802.1X EAP authentication. The computing device continues to complete the EAP exchange and establish an EAP TLS tunnel. The computing device creates a voucher request and transmits the voucher request to the registrar. A voucher request is a request to provide the identity of a network domain the computing device may trust. The registrar transmits the voucher request and the authentication key to the ("MASA") for verification. The MASA matches the received authentication key to a list of keys associated with approved devices and issues a signed voucher for the device to connect to the network. The keys may be BSKs. A signed voucher request provides the identity of a network domain that the device may trust.

Alternately, the EAP TLS tunnel may only be established if the registrar proves knowledge of an authentication key. The computing device creates a voucher request and sets a proof of possession flag indicating that the registrar has proven knowledge of the device's BSK. The computing device signs the voucher request and transmits the signed voucher request along with the set proof of possession flag to the registrar. The registrar transmits the signed voucher request with the set proof of possession flag to the MASA. The MASA confirms that the voucher request is signed and that the registrar has demonstrated proof of possession of the BSK. The MASA then issues a signed voucher.

There are two options for the BSK. The first option is an associated bootstrap key ("aBSK") wherein the BSK is associated with a computing device but is not embedded in the computing device's firmware. The computing device does not have knowledge of the aBSK. The second option is for an embedded bootstrap key ("eBSK") wherein the BSK is embedded in the computing device's firmware. The computing device has knowledge of the eBSK.

In the technology described herein, the registrar may prove knowledge of the BSK by proving knowledge of the computing device's aBSK to the MASA with the MASA issuing the signed voucher. The registrar may also prove knowledge of the BSK to the MASA by proving knowledge of the eBSK to the computing device, wherein the computing device asserts proof of the knowledge in a signed voucher request which is sent to the registrar and consequently to the MASA. The MASA then issues the signed voucher.

Alternately, the registrar has established a trust relationship with the MASA and the MASA may provide a signed voucher without being provided proof of knowledge of either the aBSK or the eBSK by the registrar. The MASA issues a signed voucher based on the established trust relationship with the registrar. The trust relationship may be established based on a legal agreement, an identity verified via short message service ("SMS") or email, a paid subscription service, or other suitable method. Establishing the trust relationship may involve an upload of a list of owned device identities, which may include serial numbers, media access control ("MAC") addresses, or any other suitable device identification information.

Leveraging the eBSK as the authentication key for onboarding computing devices, high value devices may be deployed where the local domain network proves knowledge of the eBSK before the device will even attempt the BRSKI flow. The knowledge of the eBSK by the registrar may be combined with the trust relationship between the MASA and the registrar. For the MASA to issue a signed voucher, the MASA verifies the trust relationship with the registrar and verifies that the registrar has demonstrated knowledge of the eBSK, thereby ensuring that the computing device is connecting to the correct network and the network has proof that a trusted computing device is attempting a connection.

In the technology described herein, the registrar may be represented by a network registrar function, and the registrar may be onboarding the computing device to a network enforcing 802.1X authentication where the initial device identity ("IDevID") or local device identify ("LDevID") is used as the access credential.

Alternatively, a manufacturer provided mobile application ("mobile app") may act as the BRSKI registrar, and the registrar app is onboarding the computing device to a personal mode wireless protected access 2/wireless protected access 3 ("WPA2/WPA3") 802.11 Wi-Fi network. The mobile app is downloaded, installed, and configured with the network service set identifier ("SSID") and the associated personal mode WPA2/WPA3 password.

In the technology described herein, a full MASA audit log is generated, including when the computing device is onboarded to a personal mode 802.11 network.

The technology includes various deployment models associated with the examples presented herein. Example deployment models include, but are not limited to:
  Consumer
  Small and medium-sized businesses ("SMB")
  Large enterprise
  System integrator and
  High security deployments.
Following are example workflows for each deployment model.
Consumer Deployment
  Use Case: Onboard 5 devices on WPA2/WPA3 Wi-Fi Network
  Workflow:
    1× User installs manufacturer mobile app
    1× User configures Wi-Fi SSID and password
    5× User scans label and powers up device
  End State:
    Device is provisioned with Wi-Fi SSID and password
    Device onboards to Wi-Fi network
    MASA audit log indicates that device has onboarded to a Personal Mode network.
  Notes: Manufacturer could optionally request mobile app login via verified email or SMS.
SMB Deployment
  Use Case: Onboard 100 devices on 802.1X Wired or Wi-Fi Network
  Workflow 1:
    1× installer installs network mobile app for importing device identities into authentication, authorization, accounting network security services ("AAA")
    100× Installer scans label and powers up device
  Workflow 2:
    1× Admin uploads bill of materials ("BOM") including device identities into AAA
    100× Installer powers up device
  End State:
    Device has connected to the correct Wi-Fi or wired network
    Device has 802.1X credential, the IDevID, or a new LDevID
    MASA audit log indicates that device has onboarded to a specific network.
Large Enterprise Deployment
  Use Case: Onboard 1000 devices on 802.1X Wired or Wi-Fi Network
  Workflow:
    1× Enterprise establishes trust relationship with manufacturer
    0× scans or uploads
    N× Installer powers up device
  End State:
    Device has connected to the correct Wi-Fi or wired network
    Device has 802.1X credential, the IDevID, or a new LDevID
    MASA audit log indicates that device has onboarded to a specific network.
System Integrator (SI) Deployment
  Use Case: Onboard 100 devices on each of 50 SMB 802.1X Wired or Wi-Fi Network Workflow:
    1× SI establishes trust relationship with manufacturer
    1× SI login to MASA and authorizes 50×SMB networks for onboarding
    0× scans or uploads in online mode
    50×100× Installer powers up devices
    50× SI login to MASA and revokes SMB network authorization
End State:
    Device has connected to the correct Wi-Fi or wired network
    Device has 802.1X credential, the IDevID, or a new LDevID
    MASA audit log indicates that device has onboarded to a specific network.
Notes: For SMB self-service, once SI has completed primary deployment and removed SMB authorization, the SMB can still onboard devices via label scanning or BOM import.

High Security Deployment
    Notes: Leveraging the eBSK mechanisms, high value devices can be deployed where the local domain network needs to prove knowledge of the eBSK before the device will even attempt the BRSKI flow. This can be combined with the MASA trust where the registrar needs to be explicitly trusted by the MASA.

These and other aspects, objects, features, and advantages of the examples will become apparent to those having ordinary skill in the art upon consideration of the following detailed description of illustrated examples.

Example System Architecture

Turning now to the drawings, in which like numerals indicate like (but not necessarily identical) elements throughout the figures, examples are described in detail.

Figure 1:
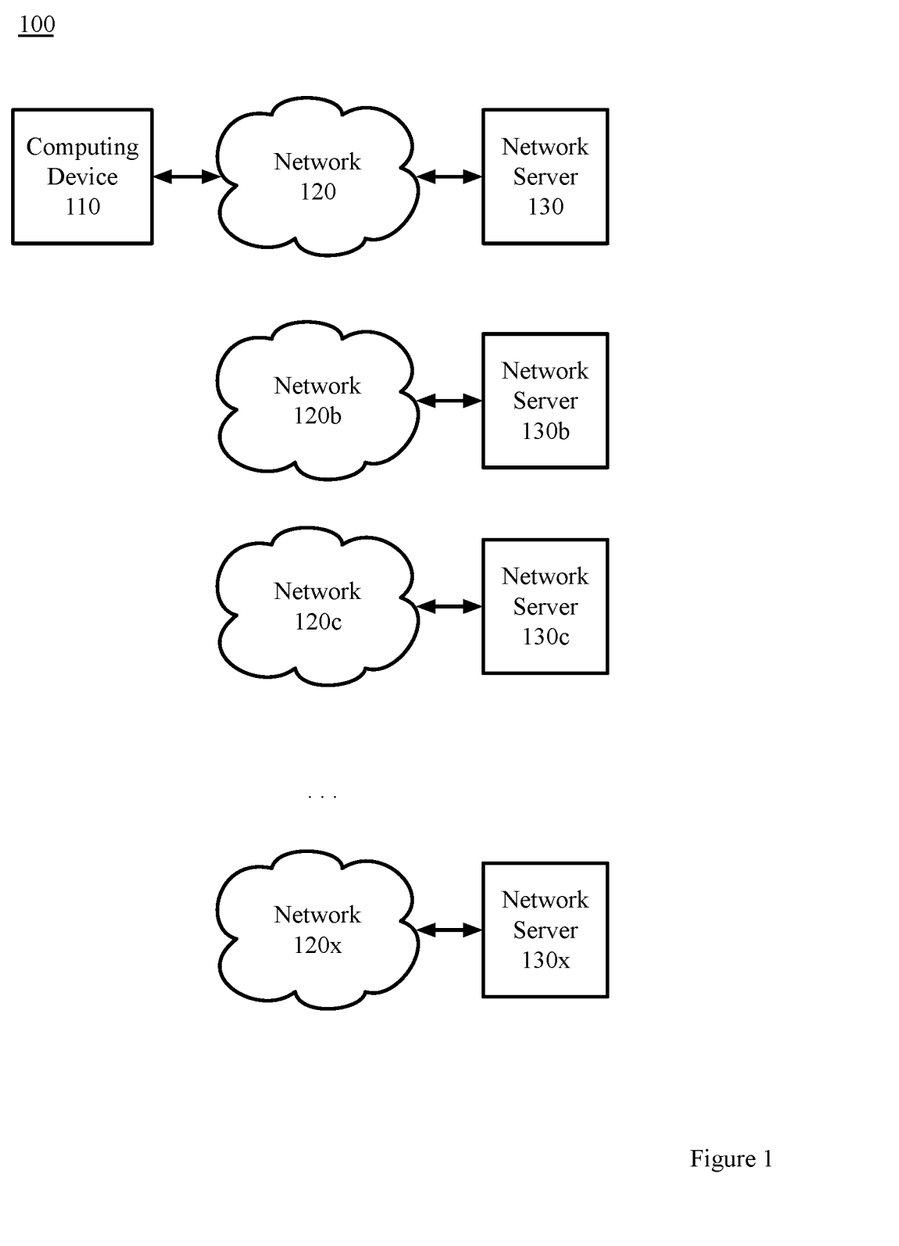
FIG. 1 is a block diagram depicting a system to use bootstrap keys to allow secure bootstrap of devices across networks, in accordance with certain examples.

FIG. 1 is a block diagram depicting a network authentication management server system, in accordance with certain examples. The network authentication management server system may be referred to as a registrar and may be comprised of one or more computing devices. As depicted in FIG. 1, the operating environment 100 comprises a network server 130 and a computing device 110 wherein the computing device 110 has proof the computing device 110 is connecting to the correct wired or wireless network and network server 130 has proof that a trusted computing device is connecting via a network 120. The operating environment 100 further comprises one or more rouge networks 120b, 120c, . . . 120x and one or more rouge network servers 130b, 130c, . . . 130x wherein trust cannot be established to connect with the computing device 110 or computing device 110 does not receive proof that the computing device 110 is connecting to the correct network.

Each network 120 comprises a wired or wireless telecommunication mechanism by which network devices can communicate and exchange data. Each network 120 can include, be implemented as, or may be a part of, a wired or wireless communication network or any other appropriate architecture or system that facilitates the communication of signals, data, and/or messages (generally referred to as data).

The computing device 110 may comprise a device having a communication module capable of transmitting and receiving data over the network 120. The computing device 110 may comprise a server, personal computer, mobile device (for example, notebook computer, handheld computer, tablet computer, netbook computer, personal digital assistant ("PDA"), video game device, GPS locator device, cellular telephone, Smartphone, or other mobile device), a television with one or more processors embedded therein and/or coupled thereto, or other appropriate technology that comprises or is coupled to a web browser or other application for communicating via the network 120.

The network computing devices and any other computing machines associated with the technology presented herein may be any type of computing machine. The computing machines discussed herein may communicate with one another, as well as with other computing machines or communication systems over one or more networks 120. The network 120 may comprise any type of data or communications network.

Example Processes

The methods illustrated in FIGS. 2-6 are described hereinafter with respect to the components of the example operating environment 100. The methods of FIGS. 2-6 may also be performed with other systems and in other environments. The operations described with respect to any of the FIGS. 2-6 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
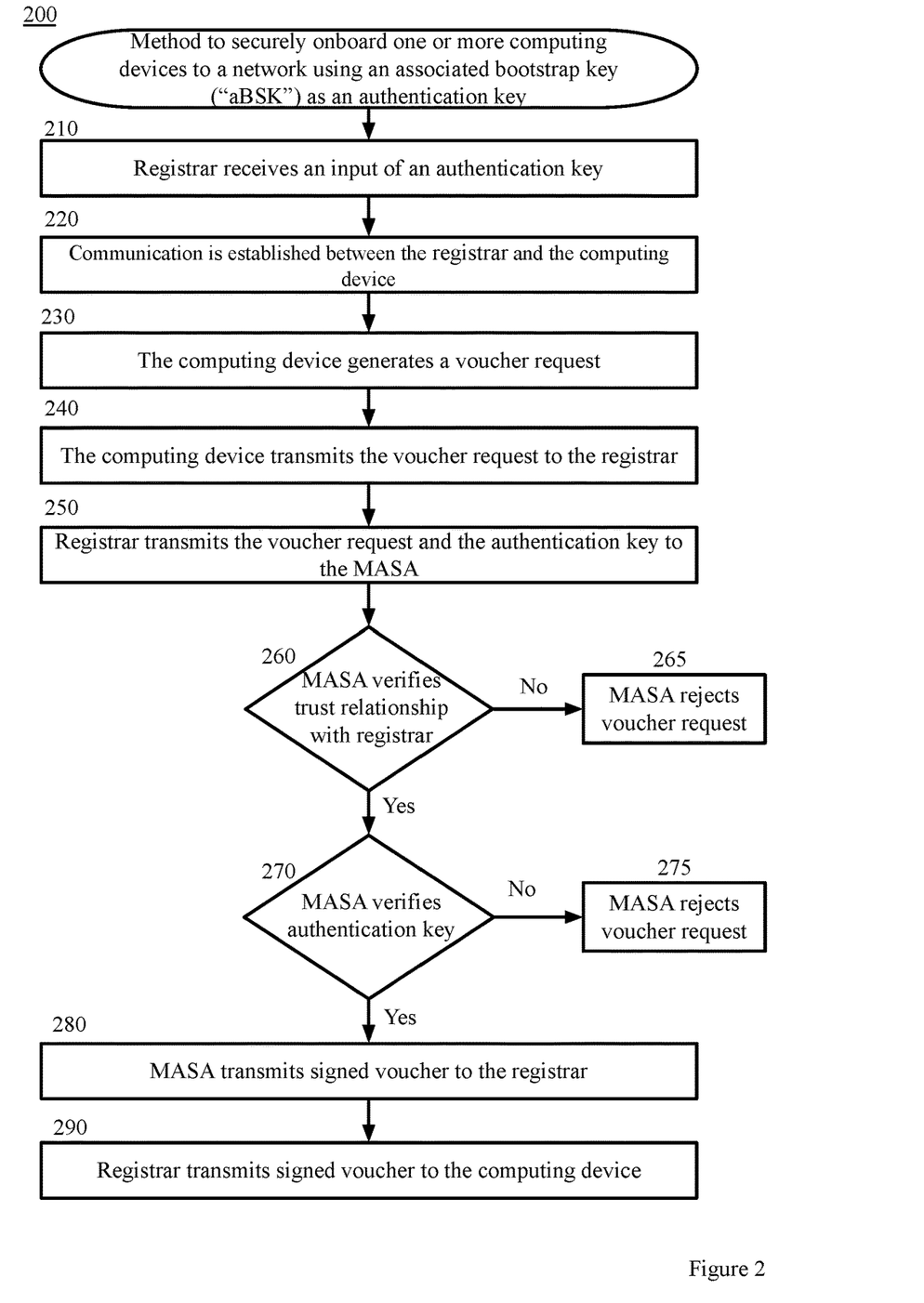
FIG. 2 is a block flow diagram depicting a method to securely onboard one or more computing devices to a network using an associated bootstrap key as an authentication key, in accordance with certain examples.

FIG. 2 is a block flow diagram depicting a method to securely onboard one or more computing devices to a network using an associated bootstrap key ("aBSK") as an authentication key, in accordance with certain examples. The one or more computing devices may be candidate computing devices. The method 200 is described with reference to the components illustrated in FIG. 1. In method 200, communications or transmissions between the one or more computing devices, the registrar, and the manufacturer authorized signing authority ("MASA") may be conducted via a network connection 120, via an Internet connection, via email, or via any other suitable communication technology, wherein the communications comprise information or data transmitted between devices.

In block 210, the registrar receives an input containing an authentication key. The authentication key may be an aBSK. The aBSK is an authentication key that is associated with the computing device but is not embedded in the computing device's firmware. The aBSK is unique for each computing device. The aBSK may be contained in a bar code affixed to the computing device, within a bill of materials ("BOM") associated with the computing device, or other suitable location. An operator may upload the computing device's aBSK to the registrar. The operator may scan a label containing the aBSK, upload a bill of materials ("BOM") that contains the aBSK, or perform any other suitable action to provide the aBSK to the registrar.

In block 220, communication is established between the computing device and the registrar. The computing device may use a handshake to establish communications with the registrar. The computing device discovers and connects to the registrar and starts an 802.1X extensible authentication protocol ("EAP") authentication. The computing device sends a transport security layer ("TLS") ClientHello and completes a TLS handshake to establish a connection to the registrar.

In block 230, the computing device generates a voucher request. The voucher request is a request to authenticate the computing device for network access. To generate the voucher request, the computing device may obtain a voucher request template and populate the voucher request template fields. Alternatively, the computing device may access a generic voucher request template from a memory or storage location, as described in greater detail in reference to FIG. 7. The voucher request template fields may include a device name or device identifier, the type of authentication requested, an identification of the network to which the device is attempting to connect, and any other suitable information to request access to the network. The type of authentication requested is a signed voucher.

In block 240, the computing device transmits the voucher request to the registrar. In block 250, the registrar transmits the voucher request and the authentication key input in block 210 to the MASA.

In block 260, the MASA verifies that the registrar is trusted. A trust relationship between the registrar and the MASA may be established based on a legal agreement, an identity verified via short message service ("SMS") or email, a paid subscription service, or other suitable method. Establishing the trust relationship may involve an upload of a list of owned device identities, which may include serial numbers, media access control ("MAC") addresses, or any other suitable device identification information. If a trust relationship cannot be verified between the registrar and the MASA, the method proceeds to block 265. In block 265, the MASA rejects the voucher request and an error message is generated and transmitted to the registrar. The registrar transmits the error message to the computing device. The computing device is not allowed access to the network.

Returning to block 260, if the trust relationship between the registrar and the MASA is verified, the method proceeds to block 270.

Alternately, the method may proceed without verification of the trust relationship between the registrar and the MASA. Block 260 may be omitted. The method may proceed from block 250 to block 270, omitting block 260.

In block 270, the MASA verifies the authentication key to determine if the authentication key transmitted by the registrar matches the aBSK associated with the computing device. The MASA may maintain a list of approved devices and associated keys. The keys may be BSKs. The MASA may maintain the list of approved devices and associated BSKs on a storage device, in a data base, or in any other suitable storage location. If the MASA cannot match the authentication key received from the registrar with an aBSK for the computing device, the method proceeds to block 275, where the MASA rejects the voucher request. The MASA generates an error message and transmits the error message to the registrar. The registrar transmits the error message to the computing device. The computing device is not allowed access to the network.

Returning to block 270, if the MASA determines the authentication key transmitted by the registrar matches an aBSK associated with the computing device, the method proceeds to block 280. In block 280, the MASA transmits a signed voucher to the registrar. The signed voucher contains information to allow the computing device to access the network. The signed voucher may contain the network name, the security key or passphrase to access the network, the signed voucher expiration time and/or date, the duration of time the signed voucher is valid, or any other suitable information to allow the computing device to establish a connection to the network. The method proceeds to block 290, where the signed voucher is transmitted from the registrar to the computing device thereby allowing access to the network.

Figure 3:
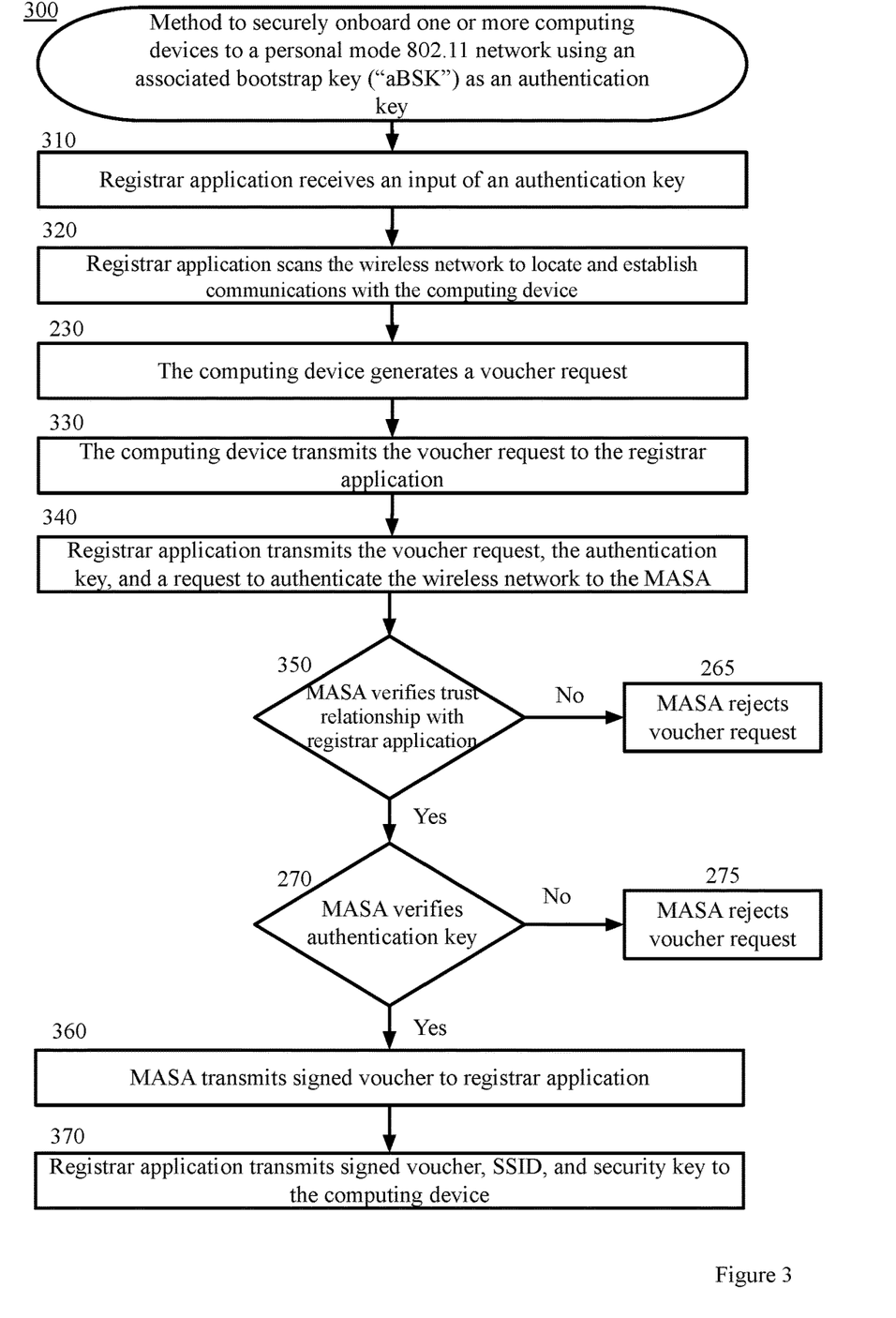
FIG. 3 is a block flow diagram depicting a method to securely onboard one or more computing devices to a personal mode 802.11 network using an associated bootstrap key as an authentication key, in accordance with certain examples.

FIG. 3 is a block flow diagram depicting a method to securely onboard one or more computing devices to a personal mode 802.11 network using an associated bootstrap key ("aBSK") as an authentication key, in accordance with certain examples. The one or more computing devices may be candidate computing devices. The method 300 is described with reference to the components illustrated in FIG. 1. In method 300, communications or transmissions between the one or more computing devices, the registrar, and the MASA may be conducted via a network connection 120, via an Internet connection, via email, or via any other suitable communication technology, wherein the communications comprise information or data transmitted between devices.

In block 310, a mobile application acting as the registrar ("registrar app") receives an input containing an authentication key. The authentication key may be the computing device's aBSK. The aBSK is an authentication key that is associated with the computing device but is not embedded in the computing device's firmware. The aBSK is unique for each computing device. The aBSK may be contained in a bar code affixed to the computing device, within a bill of materials ("BOM") associated with the computing device, or other suitable location. An operator may upload the computing device's aBSK to the registrar app. The operator may scan a label containing the aBSK, upload a bill of materials ("BOM") that contains the aBSK, or any other suitable action to provide the aBSK to the registrar app.

In block 320, the registrar app scans the network for the computing device to establish communications with the computing device. Any suitable transport mechanism may be used to transport messages during the communications. An 802.11 public action frames may be used to transport messages. The registrar app may perform an automatic Domain Name System ("DNS") lookup, ping the network for devices, search for internet protocol ("IP") addresses, search for media access control ("MAC") addresses, or any other suitable method to scan for a device. The computing device discovers and connects to the registrar app.

In block 230, upon establishing a connection with the registrar app, the computing device generates a voucher request, as previously described in greater detail with respect to FIG. 2.

In block 330, the computing device transmits the voucher request to the registrar app. In block 340, the registrar app transmits the voucher request, the authentication key input in block 310, and a flag indicating that the registrar app wants to onboard the computing device to a Wi-Fi protected access 2/Wi-Fi protected access 3 ("WPA2/WPA3") personal mode network to the MASA. The flag may be a collection of bits used as a signal to indicate the request to onboard the computing device to the network.

In block 350, the MASA verifies that the registrar app is trusted. A trust relationship between the registrar app and the MASA may be established based on a legal agreement, an identity verified via short message service ("SMS") or email, a paid subscription service, or other suitable method. Establishing the trust relationship may involve an upload of a list of owned device identities, which may include serial numbers, media access control ("MAC") addresses, or any other suitable device identification information. If a trust relationship cannot be verified between the registrar app and the MASA, the system proceeds to block 265. In block 265, the MASA rejects the voucher request and an error message is generated and transmitted to the registrar, as previously described in greater detail with respect to FIG. 2.

Returning to block 350, if the trust relationship between the registrar app and the MASA is verified, the method proceeds to block 270.

Alternately, the method may proceed without verification of the trust relationship between the registrar and the MASA. Block 350 may be omitted. The method may proceed from block 340 to block 270, omitting block 350.

In block 270, the MASA verifies the authentication key to determine if the authentication key transmitted by the registrar app matches the aBSK associated with the computing device, as previously described in greater detail with respect to FIG. 2. If the MASA cannot match the authentication key received from the registrar app with an aBSK, the method proceeds to block 275. In block 275, the MASA rejects the voucher request, as previously described in greater detail with respect to FIG. 2.

Returning to block 270, if the MASA determines the authentication key transmitted by the registrar app matches the aBSK associated with the computing device, the system proceeds to block 360. In block 360, the MASA transmits a signed voucher to the registrar app. The signed voucher contains information to allow the computing device to access the network. The signed voucher may contain the network name, the security key or passphrase to access the network, the signed voucher expiration time and/or date, the duration of time the signed voucher is valid, or any other suitable information for the computing device to establish a connection to the network.

The method proceeds to block 370, where the registrar app transmits the signed voucher received from the MASA and personal mode instructions to the computing device to allow access to the network. The registrar app transmits the signed voucher to the computing device which instructs the computing device to trust the registrar app and to allow entry into a personal mode network. The registrar app instructs the computing device to connect to the correct service set identifier ("SSID") with an associated security key such as a Wi-Fi protected access 2/Wi-Fi protected access 3 ("WPA2/WPA3") passphrase. The computing device uses the SSID and security key information to establish a connection to the network.

Figure 4:
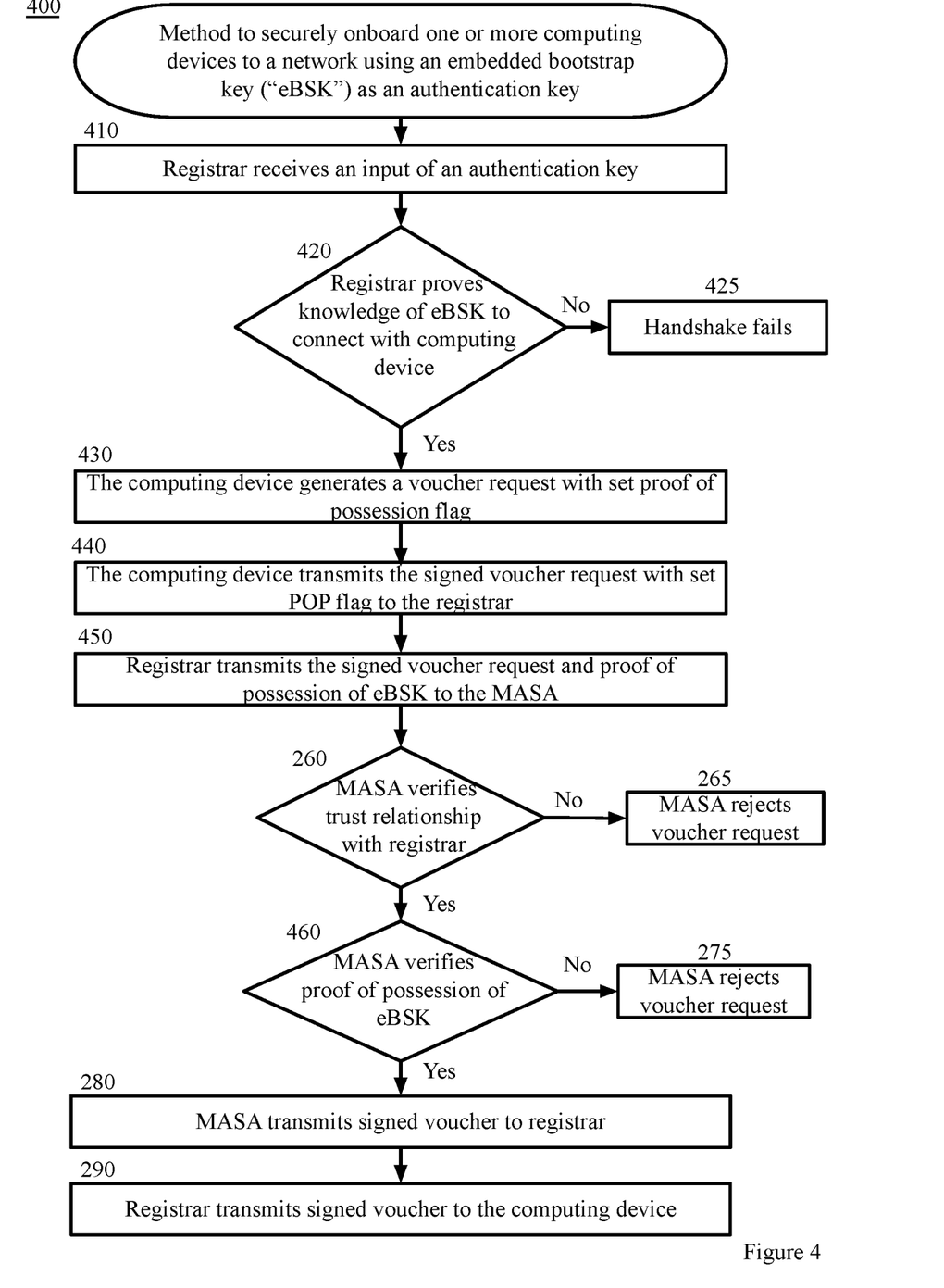
FIG. 4 is a block flow diagram depicting a method to securely onboard one or more computing devices to a network using an embedded bootstrap key as an authentication key, in accordance with certain examples.

FIG. 4 is a block flow diagram depicting a method to securely onboard one or more computing devices to a network using an embedded bootstrap key ("eBSK") as an authentication key, in accordance with certain examples. The one or more computing devices may be candidate computing devices. The method 400 is described with reference to the components illustrated in FIG. 1. In method 400, communications or transmissions between the one or more computing devices, the registrar, and the MASA may be conducted via a network connection 120, via an Internet connection, via email, or via any other suitable communication technology, wherein the communications comprise information or data transmitted between devices.

In block 410, the registrar receives an input containing an authentication key. The authentication key is an eBSK. The eBSK is an authentication key that is embedded within the computing device's firmware. The eBSK is unique for each computing device. An operator may upload the computing device's eBSK to the registrar. The operator may scan a label containing the eBSK, upload a bill of materials ("BOM") that contains the eBSK, or any other suitable action to provide the eBSK to the registrar.

In block 420, the registrar proves knowledge of the eBSK to the computing device to establish a connection with the computing device. A communication is established between the computing device and the registrar. The computing device discovers and connects to the registrar and starts an 802.1X extensible authentication protocol ("EAP") authentication. The computing device sends a TLS ClientHello when establishing the outer EAP TLS tunnel, and indicates that the computing device wants to use a TLS pre-shared key ("PSK") in establishing the connection with the registrar. The registrar can only establish the outer EAP TLS tunnel if the registrar has the PSK, which is the computing device's eBSK. The registrar uses the TLS PSK to prove knowledge of the eBSK to the computing device. If the registrar cannot prove knowledge of the eBSK to the computing device, the method proceeds to block 425.

In block 425, the TLS PSK handshake fails and the computing device does not establish a network connection. The computing device may locate a different registrar or attempt a connection to another network.

Returning to block 420, if the registrar proves knowledge of the eBSK to the computing device, the computing device and the registrar complete the TLS PSK handshake and a connection between the computing device and the registrar is established.

When the TLS PSK handshake is complete, the method proceeds to block 430 where the computing device generates a voucher request with a set proof of possession ("POP") flag. The voucher request is a request to authenticate the computing device for network access. To generate the voucher request, the computing device may obtain a voucher request template and populate the voucher request template fields. Alternatively, the computing device may access a generic voucher request template from a memory or storage location, as described in greater detail in reference to FIG. 7. The voucher request template fields may include a device name or device identifier, the type of authentication requested, an identification of the network to which the device is attempting to connect, and any other suitable information to request access to the network. The type of authentication requested is a signed voucher.

The POP flag may be a collection of bit fields used to indicate the status of the POP of the eBSK by the registrar. Setting the POP flag indicates that the computing device has confirmed that the registrar has possession of the eBSK. A set POP flag may be a signal that is transmitted to indicate that the registrar has POP of the eBSK. The computing device signs the voucher request and in block 440 transmits the signed voucher request with the set POP flag to the registrar. In block 450, the registrar transmits the signed voucher request with the set POP flag to the MASA.

The method continues to block 260. In block 260, the MASA verifies that the registrar is trusted, as previously described in greater detail with respect to FIG. 2. If a trust relationship cannot be verified between the registrar app and the MASA, the system proceeds to block 265. In block 265, the MASA rejects the voucher request and an error message is generated and transmitted to the registrar, as previously described in greater detail with respect to FIG. 2.

Returning to block 260, if the trust relationship between the registrar and the MASA is verified, the method proceeds to block 460.

Alternately, the method may proceed without verification of the trust relationship between the registrar and the MASA. Block 260 may be omitted. The method may proceed from block 450 to block 460, omitting block 260.

In block 460, the MASA verifies that the registrar has POP of the eBSK based upon receipt of the signed voucher request with the set POP flag. If the MASA cannot confirm POP of the eBSK by the registrar, the method proceeds to block 275. In block 275, the MASA rejects the voucher request, as previously described in greater detail with respect to FIG. 2.

Returning to block 460, if the MASA confirms POP of the eBSK by the registrar based upon the receipt of the set POP flag, the method proceeds to block 280. In block 280, the MASA transmits a signed voucher to the registrar, as previously described in greater detail with respect to FIG. 2. The method proceeds to block 290, where the signed voucher is transmitted from the registrar to the computing device thereby allowing access to the network, as previously described in greater detail with respect to FIG. 2.

Figure 5:
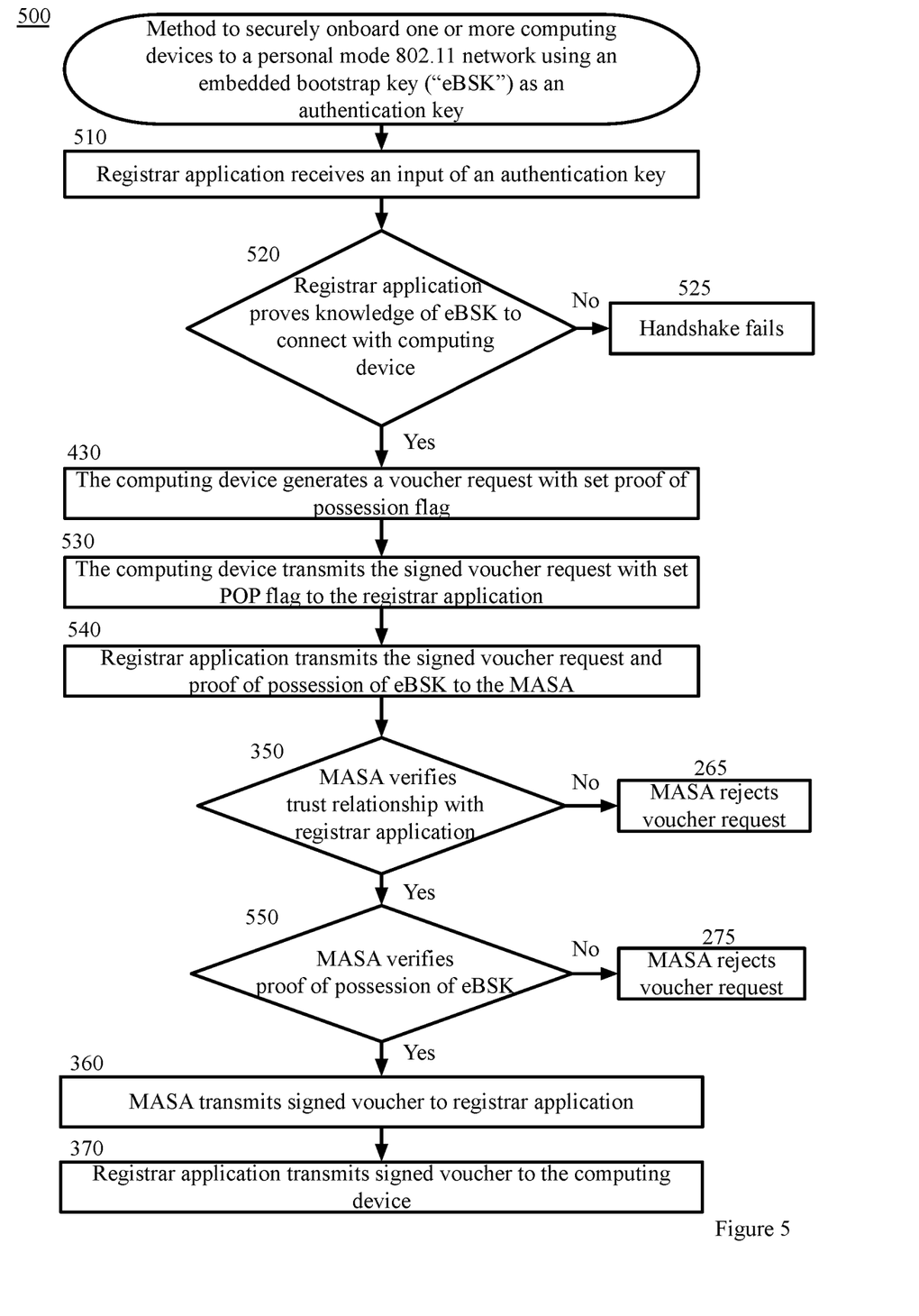
FIG. 5 is a block flow diagram depicting a method to securely onboard one or more computing devices to a personal mode 802.11 network using an embedded bootstrap key as an authentication key, in accordance with certain examples.

FIG. 5 is a block flow diagram depicting a method to securely onboard one or more computing devices to a personal mode 802.11 network using an embedded bootstrap key ("eBSK") as an authentication key, in accordance with certain examples. The one or more computing devices may be candidate computing devices. The method 500 is described with reference to the components illustrated in FIG. 1. In method 500, communications or transmissions between the one or more computing devices, the registrar, and the MASA may be conducted via a network connection 120, via an Internet connection, via email, or via any other suitable communication technology, wherein the communications comprise information or data transmitted between devices.

In block 510, a mobile application acting as the registrar ("registrar app") receives an input containing an authentication key. The authentication key is the computing device's eBSK. The eBSK is an authentication key that is embedded within the computing device's firmware. The eBSK is unique for each computing device. An operator may upload the computing device's eBSK to the registrar app. The operator may scan a label containing the eBSK, upload a bill of materials ("BOM") that contains the eBSK, or any other suitable action to provide the eBSK to the registrar app.

In block 520, the registrar app proves knowledge of the eBSK to establish a connection with the computing device. The registrar app scans the network for the computing device to establish communications with the computing device. Any suitable transport mechanism may be used to transport messages during the communications. An 802.11 public action frames may be used to transport messages. The registrar app may perform an automatic Domain Name System ("DNS") lookup, ping the network for devices, search for internet protocol ("IP") addresses, search for media access control ("MAC") addresses, or any other suitable method to scan for a device.

The registrar app may use a handshake over the transport mechanism to establish communications with the computing device and to establish that the registrar app has knowledge of the eBSK. A TLS pre-shared key ("PSK") handshake, a password authenticated key exchange ("PAKE") handshake, or any suitable handshake may be used to establish that the registrar app has knowledge of the eBSK. If the registrar application cannot demonstrate knowledge of the eBSK to the computing device, the method proceeds to block 525. In block 525, the handshake fails. The computing device does not establish a network connection. The computing device may locate a different registrar app or attempt a connection to another network.

If the handshake is successful, the method proceeds to block 430 where the computing device generates a voucher request with a set proof of possession ("POP") flag, as described in greater detail with respect to FIG. 4. The computing device signs the voucher request and in block 530 transmits the signed voucher request with the set POP flag to the registrar app. In block 540, the registrar app transmits the signed voucher request with the set POP flag to the MASA.

The method continues to block 350. In block 350, the MASA verifies that the registrar app is trusted, as previously described in greater detail with respect to FIG. 3. If a trust relationship cannot be verified and therefore the registrar app is not trusted, the method proceeds to block 265. In block 265, the MASA rejects the voucher request and an error message is generated and transmitted to the registrar, as previously described in greater detail with respect to FIG. 2.

Returning to block 350, if the trust relationship between the registrar app and the MASA is verified and therefore the registrar app is trusted, the method proceeds to block 550.

Alternately, the method may proceed without verification of the trust relationship between the registrar and the MASA. Block 350 may be omitted. The method may proceed from block 540 to block 550, omitting block 350.

In block 550, the MASA verifies that the registrar app has POP of the eBSK based upon receipt of the signed voucher request containing the set POP flag. If the MASA cannot confirm POP of the eBSK by the registrar app, the method proceeds to block 275. In block 275, the MASA rejects the voucher request, as previously described in greater detail with respect to FIG. 2.

Returning to block 550, if the MASA confirms POP of the eBSK by the registrar app based upon the receipt of the set POP flag, the method proceeds to block 360. In block 360, the MASA transmits a signed voucher to the registrar app, as previously described in greater detail with respect to FIG. 3.

The method proceeds to block 370, where the registrar app transmits the signed voucher received from the MASA and personal mode instructions to the computing device to allow access to the network, as previously described in greater detail with respect to FIG. 3.

Figure 6:
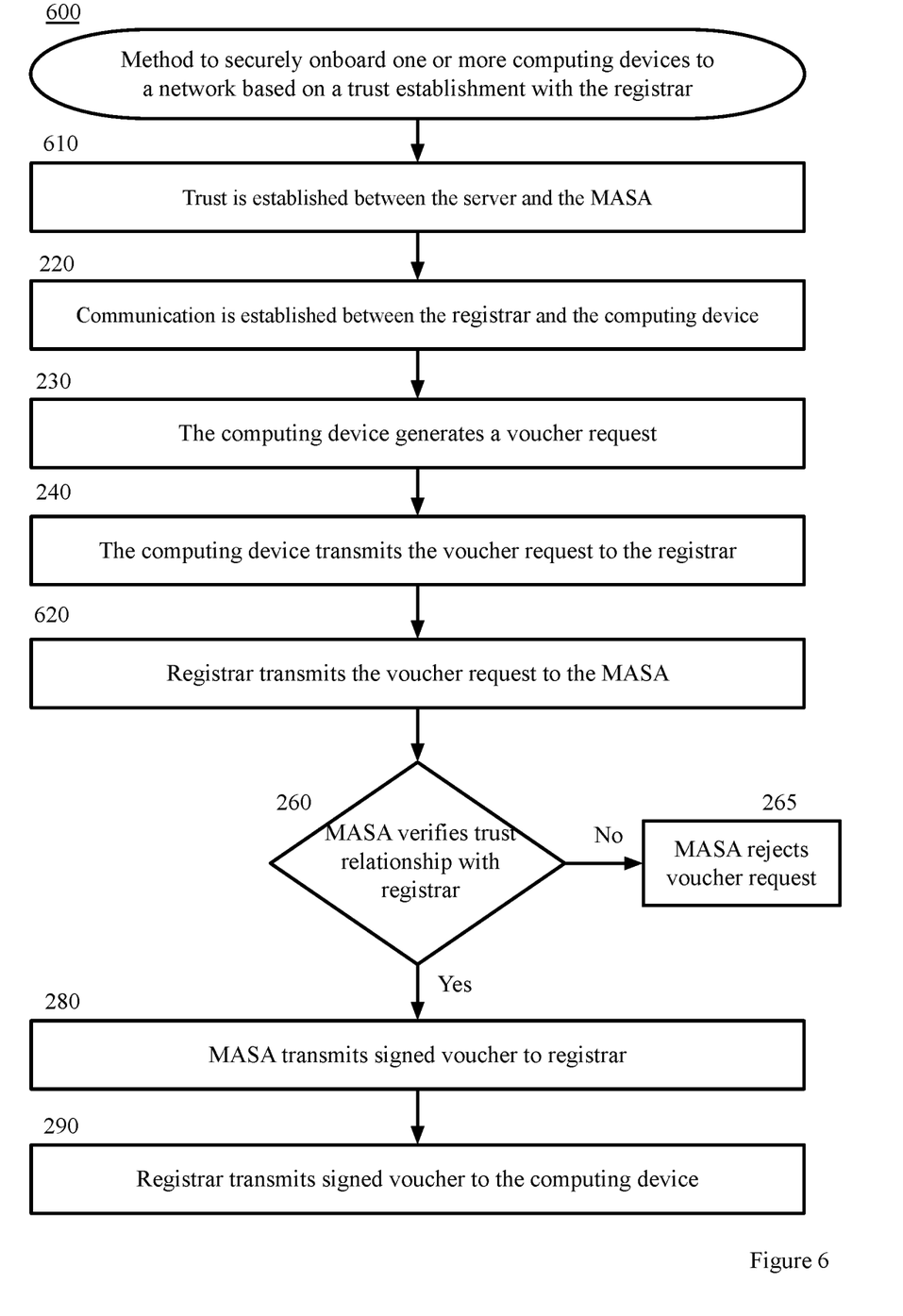
FIG. 6 is a block flow diagram depicting a method to securely onboard one or more computing devices to a network based upon a trust establishment with the registrar, in accordance with certain examples.

FIG. 6 is a block flow diagram depicting a method to securely onboard one or more computing devices to a network based on a trust establishment with the registrar, in accordance with certain examples. The one or more computing devices may be candidate computing devices. The method 600 is described with reference to the components illustrated in FIG. 1. In the method 600, an authentication key is not used to establish a network connection. In method 600, communications between devices may be conducted via a network connection 120, via an Internet connection, via email, or via any other suitable communication technology, wherein the communications comprise information or data transmitted between devices.

In block 610, a trust relationship is established between the registrar and the MASA. A trust relationship between the registrar and the MASA may be established based on a legal agreement, an identity verified via short message service ("SMS") or email, a paid subscription service, or other suitable method. Establishing the trust relationship may involve an upload of a list of owned device identities, which may include serial numbers, media access control ("MAC") addresses, or any other suitable device identification information. The trust establishment is an agreement between the registrar and the network confirming that the registrar will not onboard unauthorized computing devices.

The method continues to block 220. In block 220, communication is established between the computing device and the registrar, as previously described in greater detail with respect to FIG. 2.

Continuing to block 230, the computing device generates a voucher request, as previously described in greater detail with respect to FIG. 2. In block 240, the computing device transmits the voucher request to the registrar, as previously described in greater detail with respect to FIG. 2. In block 620, the registrar transmits the received voucher request to the MASA. The method continues to block 260. In block 260, the MASA verifies that the registrar is trusted, as previously described in greater detail with respect to FIG. 2. If a trust relationship between the registrar and the MASA cannot be verified, the system proceeds to block 265. In block 265, the MASA rejects the voucher request and an error message is generated and transmitted to the registrar, as previously described in greater detail with respect to FIG. 2.

Returning to block 260, if the trust relationship between the registrar and the MASA is verified, the method proceeds to block 280. In block 280, the MASA transmits a signed voucher to the registrar, which is described in greater detail in reference to FIG. 2.

The method proceeds to block 290, where the signed voucher is transmitted from the registrar to the computing device thereby allowing access to the network, which is described in greater detail in reference to FIG. 2.

Other Examples

Figure 7:
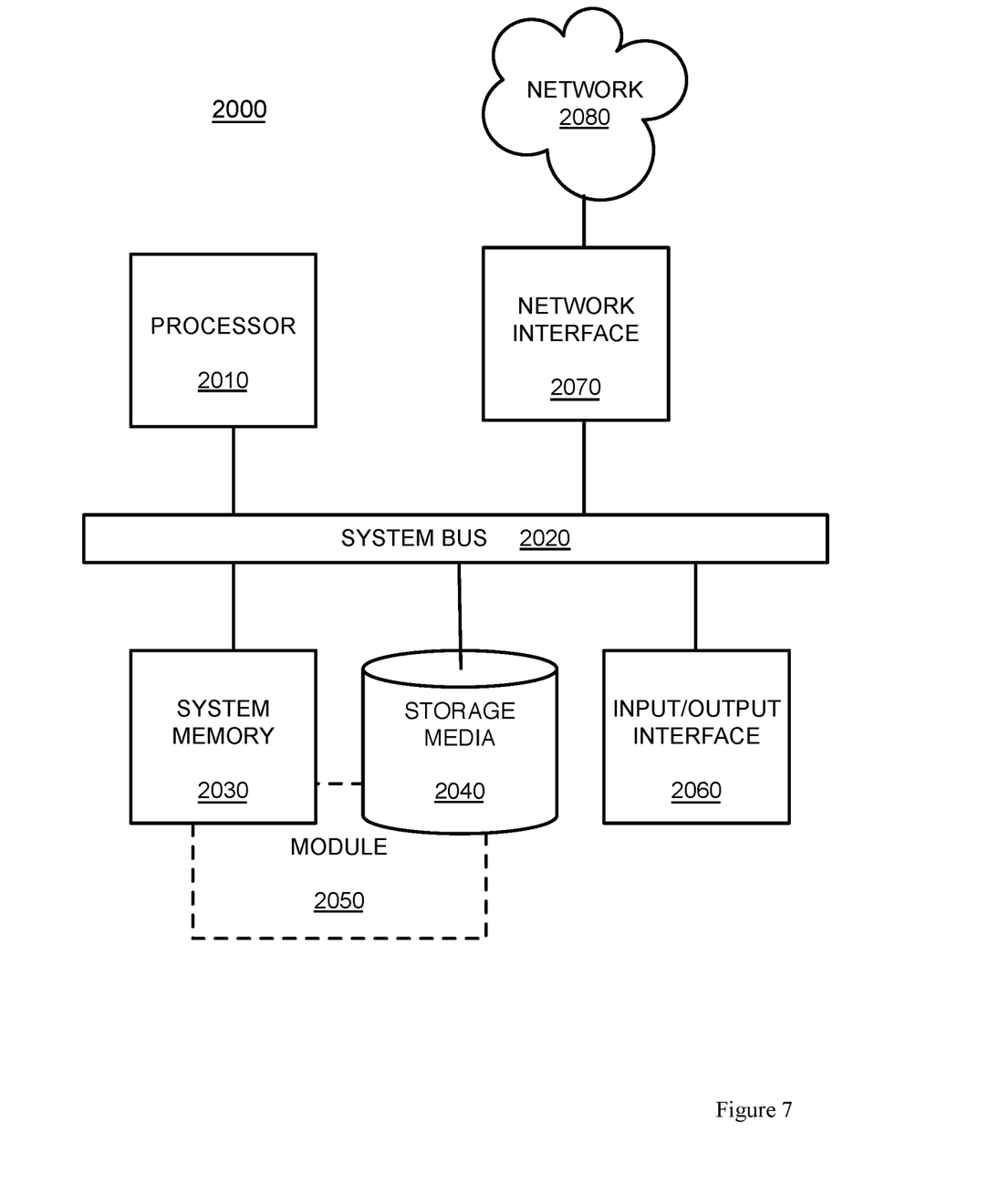
FIG. 7 is a block diagram depicting a computing machine and a module, in accordance with certain examples.

FIG. 7 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. The processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. Any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A method, comprising:
    obtaining, by a registrar computing device, an authentication key associated with a candidate computing device;
    obtaining, by the registrar computing device from the candidate computing device, a voucher request, wherein the voucher request is a request to authenticate a network to which the candidate computing device will connect;
    providing, by the registrar computing device to an authorizing computing device, the voucher request and the authentication key;
    obtaining, by the registrar computing device from the authorizing computing device, a signed voucher, wherein the signed voucher comprises a verification of the registrar computing device and a verification of the authentication key, the verification of the registrar computing device comprising determining, by the authorizing computing device, that a device identity associated with the registrar computing device is on a list of approved device identities, and the verification of the authentication key comprising determining, by the authorizing computing device, that the authentication key matches a key associated with a list of approved computing devices maintained by the authorizing computing device; and providing, by the registrar computing device to the candidate computing device, the signed voucher, wherein the signed voucher authenticates the network to which the candidate computing device will connect.

2. The method of claim 1, wherein the registrar computing device is a network access server.

3. The method of claim 1, wherein the registrar computing device is a mobile registrar application and the network is a wireless network.

4. The method of claim 1, wherein the authentication key is obtained by the registrar computing device based on an input of the authentication key into the registrar computing device.

5. The method of claim 1, further comprising obtaining, by the registrar computing device from the candidate computing device, a request to establish a connection with the registrar computing device prior to the registrar computing device obtaining the voucher request from the candidate computing device.

6. The method of claim 5, wherein the connection is established using an extensible authentication protocol.

7. The method of claim 1, wherein the voucher request is generated by the candidate computing device.

8. A computer program product, comprising:
a non-transitory computer-readable medium having computer-readable program instructions embodied thereon, the computer-readable program instructions comprising computer-readable program instructions to:
obtain, by a registrar computing device, an authentication key associated with a candidate computing device;
obtain, by the registrar computing device from a candidate computing device, a voucher request, wherein the voucher request is a request to authenticate a network to which the candidate computing device will connect;
provide, by the registrar computing device to an authorizing computing device, the voucher request and the authentication key;
obtain, by the registrar computing device from the authorizing computing device, a signed voucher, wherein the signed voucher comprises a verification of the registrar computing device and a verification of the authentication key, the verification of the registrar computing device comprising determining, by the authorizing computing device, that a device identity associated with the registrar computing device is on a list of approved device identities, and the verification of the authentication key comprising determining, by the authorizing computing device, that the authentication key matches a key associated with a list of approved computing devices maintained by the authorizing computing device; and
provide, by the registrar computing device, the signed voucher to the candidate computing device, wherein the signed voucher authenticates the network to which the candidate computing device will connect.

9. The computer program product of claim 8, wherein the registrar computing device is a mobile registrar application and the network is a wireless network.

10. The computer program product of claim 9, further comprising computer-readable instructions to:
scan, by the mobile registrar application, the wireless network for the candidate computing device;
provide, by the mobile registrar application to the authorizing computing device, the voucher request, the authentication key, and a request to authenticate the wireless network to which the candidate computing device will connect;
obtain, by the mobile registrar application from the authorizing computing device, a signed voucher, wherein the signed voucher instructs the candidate computing device to trust the mobile registrar application and allows connection to the wireless network; and
provide, by the mobile registrar application to the candidate computing device, a communication comprising:
the signed voucher instructing the candidate computing device to connect to the wireless network, and
a service set identifier and a password to connect to the wireless network.

11. The computer program product of claim 8, wherein the authentication key is obtained by the registrar computing device based on an input of the authentication key into the registrar computing device.

12. The computer program product of claim 8, further comprising computer-readable instructions to obtain, by the registrar computing device from the candidate computing device, a request to establish a connection with the registrar computing device prior to the registrar computing device obtaining the voucher request from the candidate computing device.

13. The computer program product of claim 12, wherein the connection is established using an extensible authentication protocol.

14. The computer program product of claim 8, wherein the voucher request is generated by the candidate computing device.

15. A registrar computing system, comprising:
a registrar computing system storage device; and
a registrar computing system processor communicatively coupled to the registrar computing system storage device, wherein the registrar computing system processor executes application code instructions that are stored in the registrar computing system storage device to cause the system to:
obtain an authentication key associated with a candidate computing device;
obtain a voucher request, wherein the voucher request is a request to authenticate a network to which the candidate computing device will connect;
provide, to an authorizing computing device, the voucher request and the authentication key;
obtain, from the authorizing computing device, a signed voucher, wherein the signed voucher comprises a verification of the registrar computing system and a verification of the authentication key, the verification of the registrar computing device comprising determining that a device identity associated with the registrar computing device is on a list of approved device identities, and the verification of the authentication key comprising determining that the authentication key matches a key associated with a list of approved computing devices maintained by the authorizing computing device; and provide, to the candidate computing device, the signed voucher, wherein the signed voucher authenticates the network to which the candidate computing device will connect.

16. The system of claim 15, wherein the authentication key is obtained based on an input of the authentication key.

17. A method, comprising:
obtaining, by a registrar computing device, an authentication key associated with a candidate computing device, wherein the registrar computing device is a mobile registrar application;

scanning, by the mobile registrar application, a network for the candidate computing device, wherein the network is a wireless network;

obtaining, by the mobile registrar application from the candidate computing device, a voucher request, wherein the voucher request is a request to authenticate the wireless network to which the candidate computing device will connect;

providing, by the mobile registrar application to an authorizing computing device, the voucher request, the authentication key, and a request to authenticate the wireless network to which the candidate computing device will connect;

obtaining, by the mobile registrar application from the authorizing computing device, a signed voucher, wherein the signed voucher comprises a verification of the mobile registrar application and a verification of the authentication key, and wherein the signed voucher instructs the candidate computing device to trust the mobile registrar application and allows connection to the wireless network; and providing, by the mobile registrar application to the candidate computing device, a communication comprising:
the signed voucher, wherein the signed voucher authenticates the wireless network to which the candidate computing device will connect and instructs the candidate computing device to connect to the wireless network, and
a service set identifier and a password to connect to the wireless network.

18. The method of claim 17, wherein the authentication key is obtained by the mobile registrar application based on an input of the authentication key.

19. The method of claim 17, wherein the voucher request is generated by the candidate computing device.

* * * * *